(12) United States Patent
Iwatsuka

(10) Patent No.: US 8,259,370 B2
(45) Date of Patent: Sep. 4, 2012

(54) IMAGE READING DEVICE HAVING LINE SENSOR PERFORMING PRE-SCAN BASED ON CONDITION SET FOR MAIN-SCAN

(75) Inventor: Kentaro Iwatsuka, Gifu-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 764 days.

(21) Appl. No.: 12/475,283

(22) Filed: May 29, 2009

(65) Prior Publication Data

US 2009/0296172 A1 Dec. 3, 2009

(30) Foreign Application Priority Data

May 30, 2008 (JP) ................. 2008-142695

(51) Int. Cl.
*G06K 15/00* (2006.01)
*H04N 1/04* (2006.01)
*H04N 1/46* (2006.01)
(52) U.S. Cl. ...................................... 358/509
(58) Field of Classification Search ............ None
See application file for complete search history.

(56) References Cited

U.S. PATENT DOCUMENTS

| 5,513,018 | A | 4/1996 | Nisimura |
| 2004/0008387 | A1 | 1/2004 | Ikeno |
| 2007/0285739 | A1 | 12/2007 | Nakano et al. |

FOREIGN PATENT DOCUMENTS

| JP | H01-165264 A | 6/1989 |
| JP | H03-288473 A | 12/1991 |
| JP | H05-075780 A | 3/1993 |
| JP | H05-207239 A | 8/1993 |
| JP | H05-268423 A | 10/1993 |
| JP | H06-098094 A | 4/1994 |
| JP | H09-009000 A | 1/1997 |
| JP | 2001-251479 A | 9/2001 |
| JP | 2003-274112 A | 9/2003 |
| JP | 2004-048167 A | 2/2004 |
| JP | 2005-005945 A | 1/2005 |
| JP | 2007-104575 A | 4/2007 |
| JP | 2007-306486 A | 11/2007 |

OTHER PUBLICATIONS

Japan Patent Office, Office Action for Japanese Patent Application No. 2008-142695, mailed Dec. 7, 2010.
Japan Patent Office, Office Action for Japanese Patent Application No. 2008-142695, mailed Jul. 13, 2010.

*Primary Examiner* — Benny Q Tieu
*Assistant Examiner* — Haris Sabah
(74) *Attorney, Agent, or Firm* — Baker Botts L.L.P.

(57) ABSTRACT

An image reading device includes a reading unit for reading a document. The reading unit includes red color green color and blue color light sources and a plurality of light receiving elements aligned in a main scanning direction. In a pre-scan performed precedent to a main-scan, the reading unit reads a part of the document with a lower reading resolution than the reading resolution in the main-scan in order to gather information about the document placed on a document reading table. An optimum light amount to be emanated from the light source at the time of main-scan is set while changing the light amount from the light source and checking the outputs from the light receiving elements. An optimum light amount to be emanated from the light source at the time of pre-scan is calculated based on the optimum light amount set for the main-scan.

19 Claims, 9 Drawing Sheets

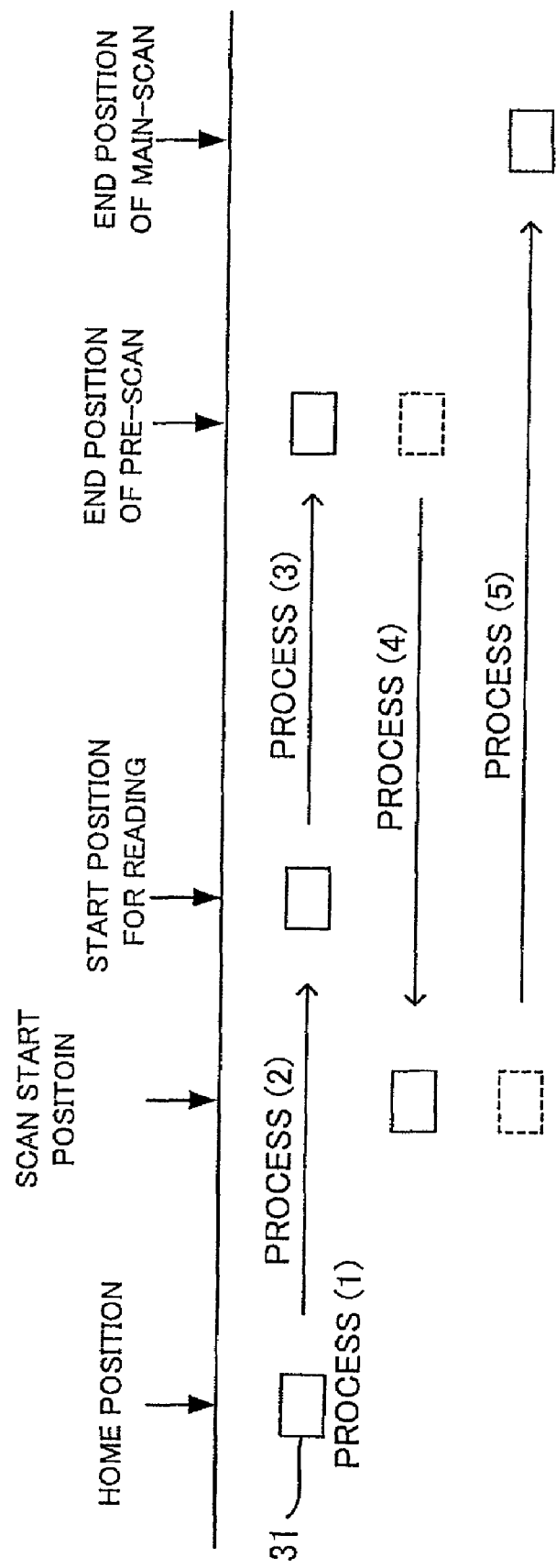

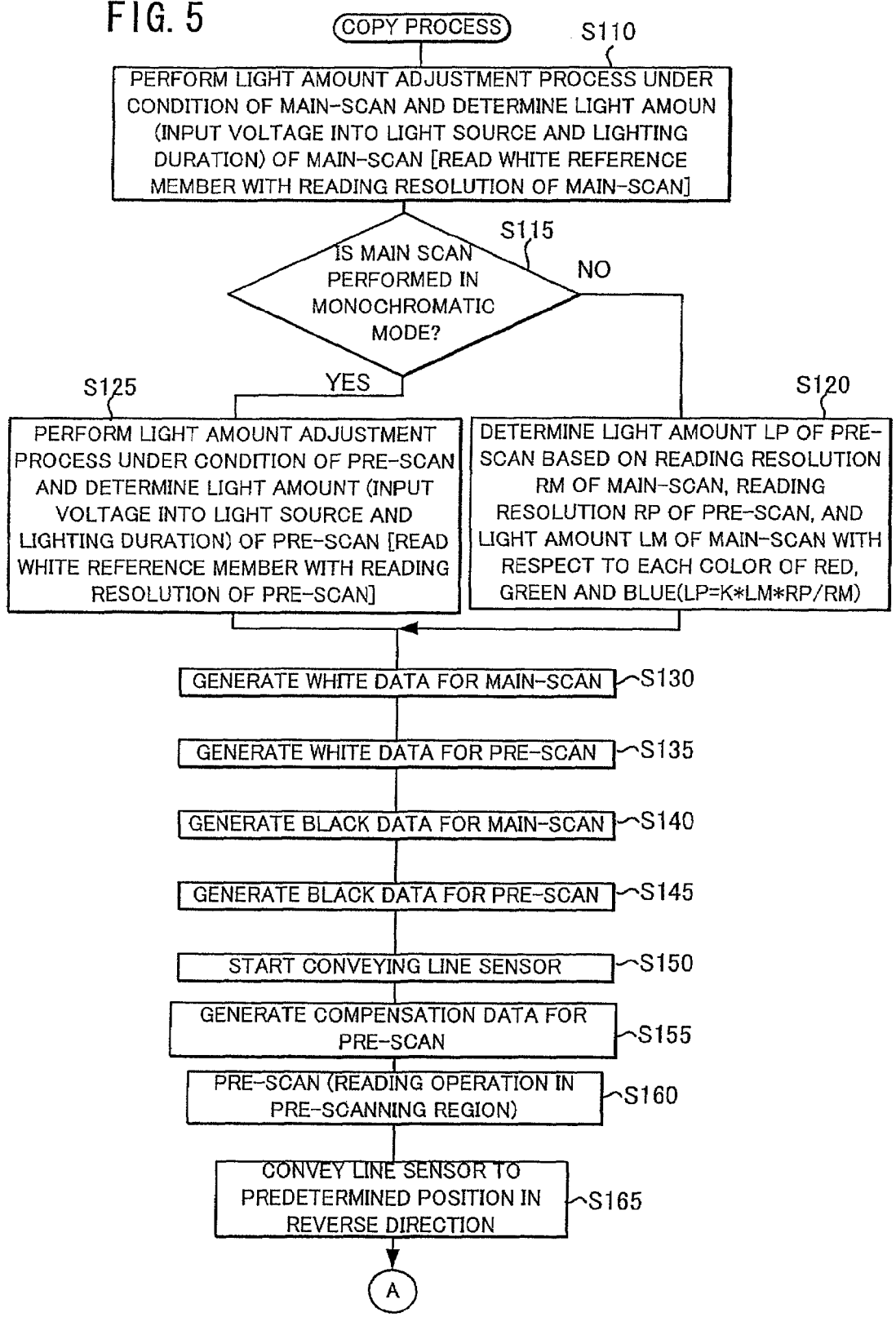

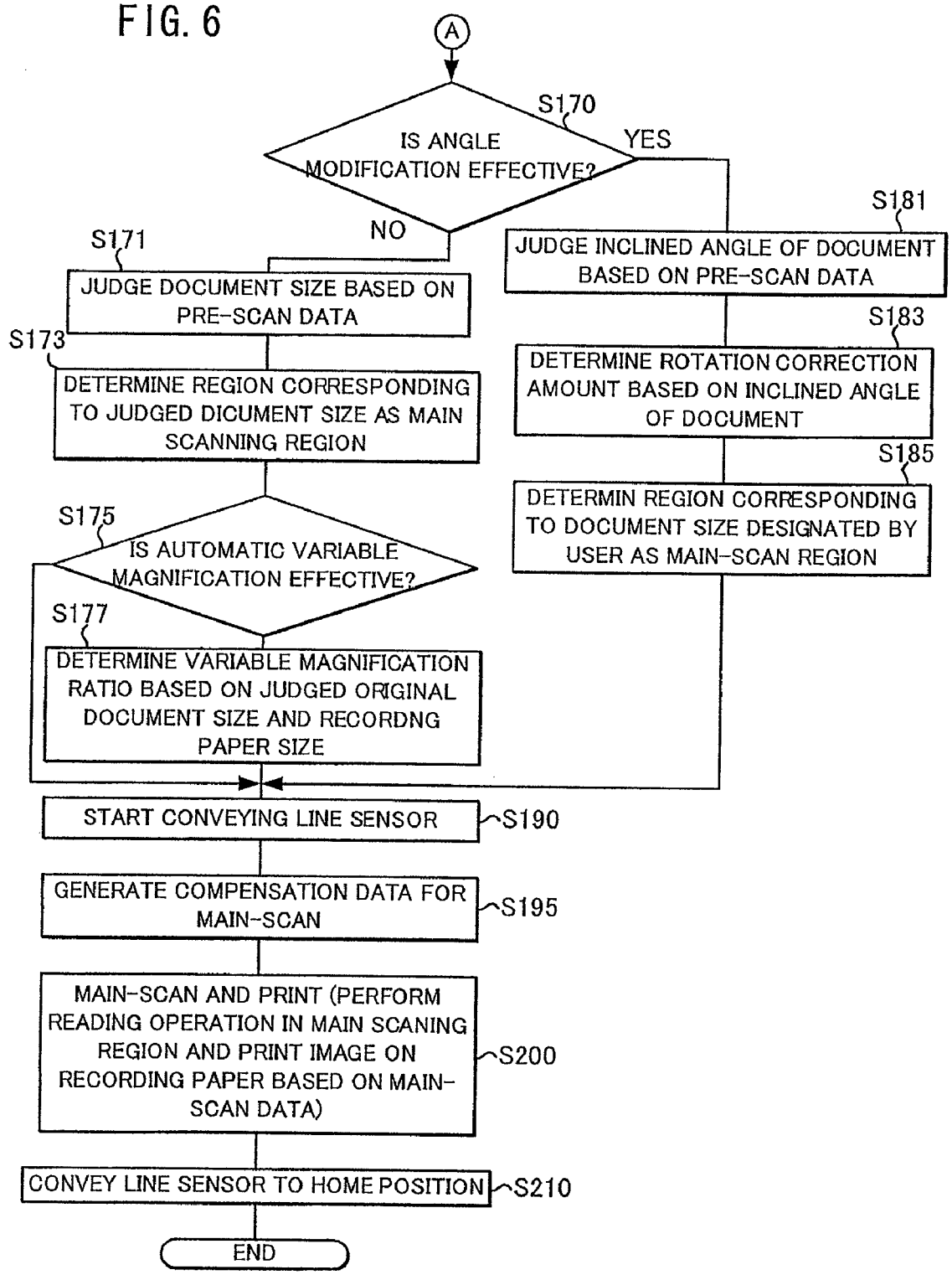

FIG. 8
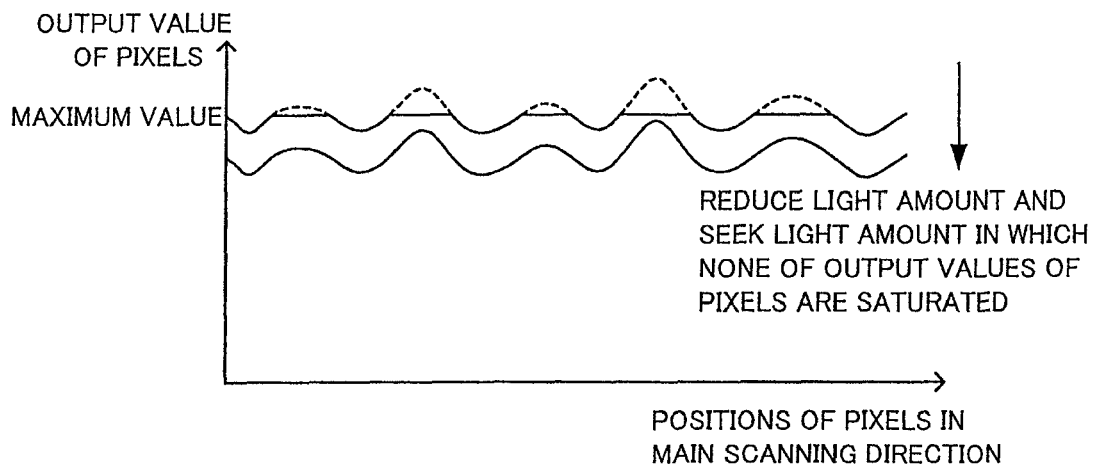
FIG. 9A
(COMPENSATION DATA)
| PIXEL | SHADING COMPENSATION AMOUNT | BLACK COMPENSATION AMOUNT |
|---|---|---|
| 0 | 255/(230−10) | 10 |
| 1 | ... | ... |
| 2 | ... | ... |
| ... | ... | ... |
FIG. 9B
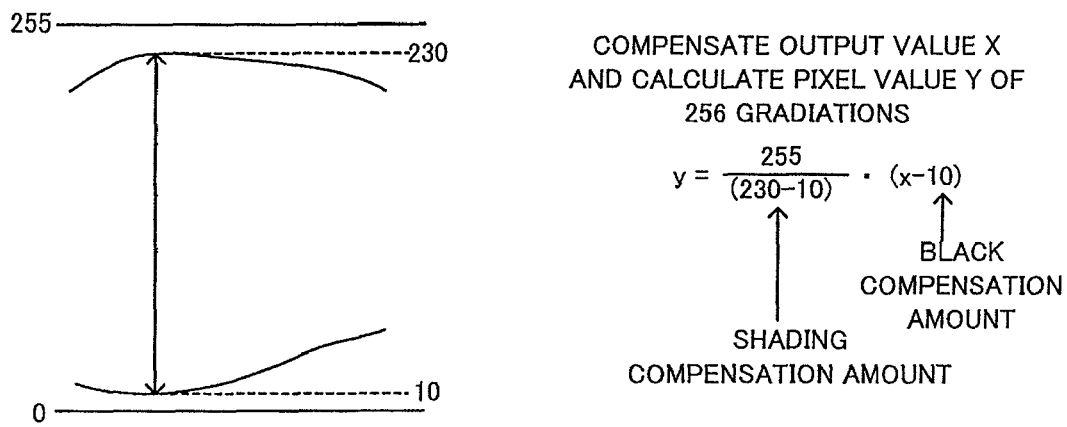
COMPENSATE OUTPUT VALUE X
AND CALCULATE PIXEL VALUE Y OF
256 GRADIATIONS
$$y = \frac{255}{(230-10)} \cdot (x-10)$$
↑ SHADING COMPENSATION AMOUNT
↑ BLACK COMPENSATION AMOUNT

IMAGE READING DEVICE HAVING LINE SENSOR PERFORMING PRE-SCAN BASED ON CONDITION SET FOR MAIN-SCAN

CROSS REFERENCE TO RELATED APPLICATION

This application claims priority from Japanese Patent Application No. 2008-142695 filed May 30, 2008. The entire content of the priority application is incorporated herein by reference.

TECHNICAL FIELD

The present invention relates to an image reading device for reading images on an object by irradiating the object with light from a light source. The invention further relates to a method of controlling the image reading device and also to a storage medium storing computer executable programs for controlling the image reading device.

BACKGROUND

It has been well known that in a conventional image reading device, an object, such as document, is read by irradiating the document with light from a light source and receiving the light reflected from the document at light receiving elements.

In such a conventional image reading device, a document placed on a document placing table is read by a reading unit having light sources and light receiving elements. The light receiving elements are aligned in a main scanning direction. To read the document, the reading unit is moved in an auxiliary scanning direction perpendicular to the main scanning direction.

The conventional image reading device has a function for detecting the size of a document placed on a document placing table. More specifically, a top end portion of the document is read and the side edge of the document is extracted to determinate the size of the document.

Alternatively, the size of a document can be determined through a pre-scan performed prior to reading a document. In the pre-scan, the reading unit is moved to scan over the entire area of the document.

Generally, in order to adjust a light amount emanated from a light source, the reading unit reads a white reference member prior to reading the document. The light amount is adjusted so that the output value of the reading unit is not saturated when a white color (the white reference member) is read.

The white reference member is irradiated with light having an adjusted intensity in order to define white data. Black data is defined by the output from the reading unit when the white reference member is not irradiated with the light. When a document is read, the document is read with the light having the adjusted intensity. Shading compensation is performed with respect to the white data and the black data. On the shading compensation, a pixel value is determined by correcting the output value for the reading unit. A process for adjusting the light amount and a process for generating the white data and the black data will be hereinafter referred to as a "pre-process".

Further, in an image reading device performing a pre-scan, prior to the pre-scan, the pre-process is performed for the sake of the subsequently performed pre-scan. A document is pre-scanned according to the results of the pre-process. Subsequent to the pre-scan, the reading unit is once returned to the home position. A main-scan is performed after the pre-process for the main-scan is performed.

If the pre-process is performed for each of the pre-scan and the main-scan each time by reading the white reference member, it takes longer to read a single page of a document due to duration of time required for the pre-process.

SUMMARY

In view of the foregoing, the present invention is to provide an image reading device that reads a document by executing a main-scan subsequent to a pre-scan, and it is an object of the present invention to provide an image reading device capable of executing a series of processes at a high speed.

This and other objects of the present invention will be attained by providing an image reading device. The image reading device includes a reading unit, a conveying section, a first light amount determining section, a second light amount determining section, a pre-scan section, and a main-scan section. The reading unit includes a light source and a predetermined number of light receiving elements aligned in a first direction. The light source irradiates light onto an object to be read. At least a part of the predetermined number of light receiving elements receives light reflected from the object. The reading unit outputs line data representing a line image on the object. The conveying section conveys the reading unit in a second direction perpendicular to the first direction. The first light amount determining section is configured to determine a first light amount to be emanated from the light source. The second light amount determining section is configured to determine a second light amount to be emanated from the light source based on the first light amount determined by the first light amount determining section. The pre-scan section is configured to perform a pre-scan to gather information about the object by controlling the conveying section to move the reading unit in the second direction and further controlling the reading unit to read the object on a line-by-line basis with a first resolution while emanating the second light amount from the light source. The main-scan section is configured to perform a main-scan to read the object by controlling the conveying section to move the reading unit in the second direction and further controlling the reading unit to read the object on a line-by-line basis with a second resolution while emanating the first light amount from the light source. Control operations by the main-scan section are performed after completion of control operations by the pre-scan section.

According to another aspect, the present invention provides a method of controlling the image reading device. The image reading device includes a reading unit in which a light source is disposed for irradiating light onto an object to be read and a predetermined number of light receiving elements is aligned in a first direction. The reading unit outputs line data representing a line image on the object. The method of controlling the image reading device includes determining a first light amount to be emanated from a light source, determining a second light amount to be emanated from the light source based on the first light amount, after determining the first light amount and the second light amount, performing a pre-scan to gather information about the object by moving the reading unit in a second direction perpendicular to the first direction and controlling the reading unit to read the object on a line-by-line basis with a first resolution while emanating the second light amount from the light source, and after performing the pre-scan, performing a main-scan to read the object by moving the reading unit in the second direction and controlling the reading unit to read the object on a line-by-line basis with a second resolution while emanating the first light amount from the light source.

According to still another aspect, the present invention provides a computer-readable storage medium. The computer-readable storage medium stores a set of program instructions installed on and executed by a computer for controlling an image reading device. The image reading device includes a reading unit in which a light source is disposed for irradiating light onto an object to be read and a predetermined number of light receiving elements are aligned in a first direction. The reading unit outputs line data representing a line image on the object. The program instructions includes determining a first light amount to be emanated from a light source, determining a second light amount to be emanated from the light source based on the first light amount, performing a pre-scan to gather information about the object by moving the reading unit in a second direction perpendicular to the first direction and controlling the reading unit to read the object on a line-by-line basis with a first resolution while emanating the second light amount from the light source, and after performing the pre-scan, performing a main-scan to read the object by moving the reading unit in the second direction and controlling the reading unit to read the object on a line-by-line basis with a second resolution while emanating the first light amount from the light source.

BRIEF DESCRIPTION OF THE DRAWINGS

The particular features and advantages of the invention as well as other objects will become apparent from the following description taken in connection with the accompanying drawings, in which:

FIG. 4 is an explanatory diagram showing movements of the line sensor when a copying process is performed;

FIG. 5 is a flowchart illustrating steps in a copying process;

FIG. 6 is a flowchart illustrating steps in a copying process;

FIG. 8 is an explanatory diagram illustrating a method of determining an optimum value of a light amount in an actual adjustment process;

FIG. 9A is a conceptual diagram of compensation data;

FIG. 9B is an explanatory diagram showing a method of compensating for line data;

DETAILED DESCRIPTION

Figure 1A:
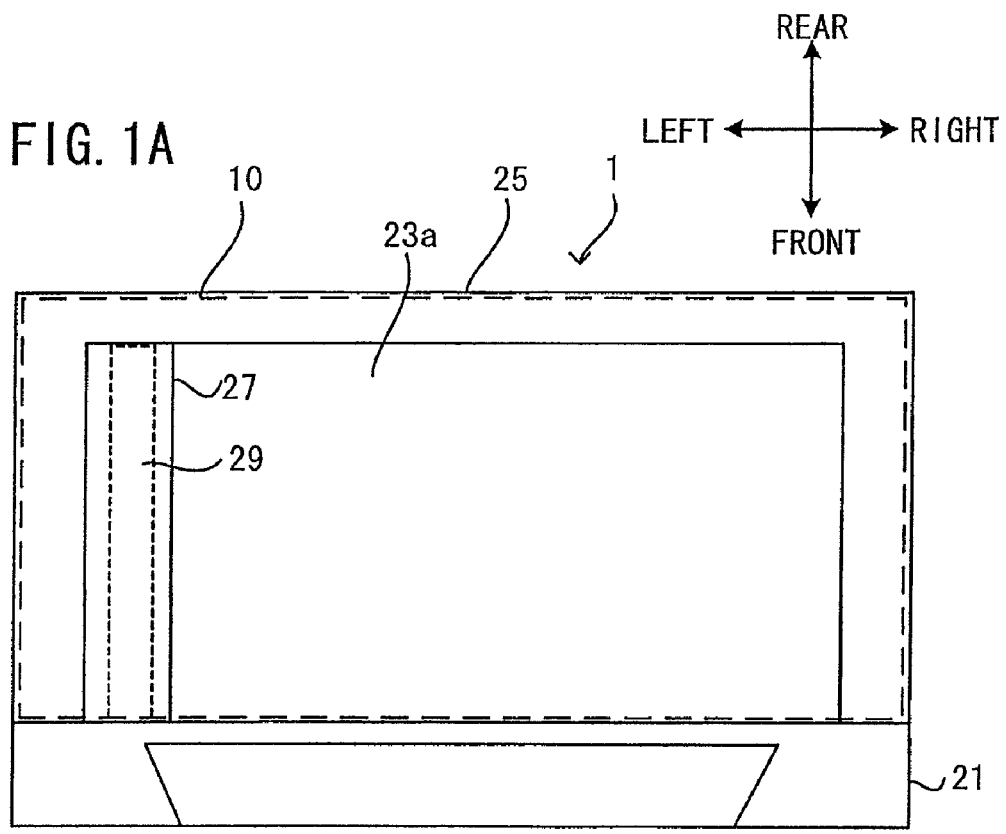
FIG. 1A is a schematic top plan view of a multifunction peripheral, in which a main cover thereof does not appear due to transparency.

Next, a digital multifunction peripheral according to an embodiment of the present invention will be described with reference to FIGS. 1A to 10B.

The digital multifunction peripheral 1 according to the present embodiment has a scanner function, a printer function, and a copier function. The multifunction peripheral 1 includes a reading section 3 in an upper portion thereof, and a printing section (not shown) in a lower portion thereof.

The printing section includes a recording head, a recording head conveying section, and a paper conveying section for supplying recording paper and conveying the same to a recording position. The reading section functions as a scanner. The reading section includes a line sensor 31 and a line sensor conveying section.

The multifunction peripheral 1 includes a main body 20 and a main cover 10. The main cover 10 is disposed above the main body 20 and movable between an open position and a closed position. In a state that the main cover 10 is closed, an upper surface of the main body 20 is covered by the main cover 10. The main body 20 has a display operation unit 21 on a front portion thereof. The display operation unit 21 has various operating switches and a liquid crystal display. The reading section 3 is mounted in an upper portion of the main body 20, and is substantially the same as a flat bed type scanner device.

The main body 20 includes a platen glass 23, a housing 25 for supporting the platen glass 23, a cover member 27, a white reference member 29 provided on a rear surface of the cover member 27, a line sensor 31, a carriage 33 for mounting the line sensor 31 thereon, a belt conveying section 35, and a motor 37 for driving the belt conveying section 35.

Figure 1B:
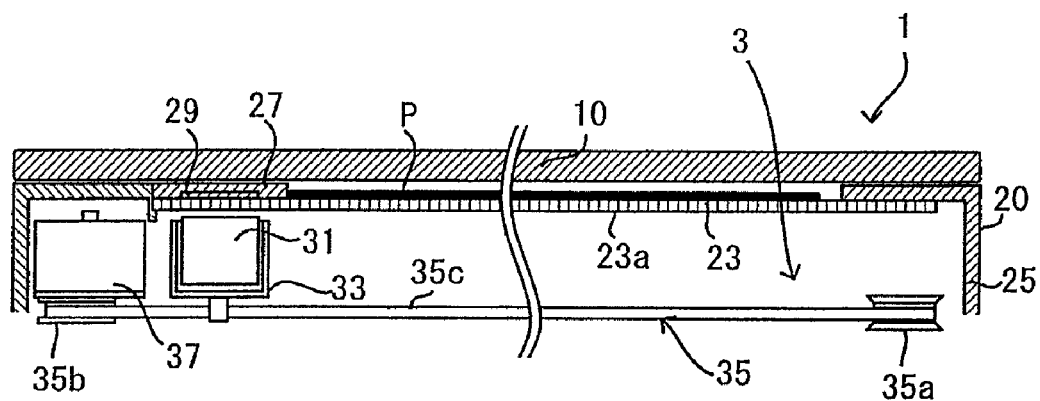
FIG. 1B is a schematic cross-sectional view of the multifunction peripheral taken along a line extending in an auxiliary scanning direction of a reading section, in which the reading section is partially illustrated and depiction of a printing section is omitted.

The housing 25 is generally of a box-shaped and has an opening on an upper surface thereof. The platen glass 23 is mounted on the housing 25 so as to cover the opening of the housing 25. In FIG. 1B, details of the housing 25 are omitted for the sake of simplicity. The housing 25 has a structure for supporting the platen glass 23 to be fixed thereon.

The cover member 27 is an elongated rectangle-shaped plate extending in a main scanning direction. The cover member 27 is disposed on an upper surface of the platen glass 23 and extends along the left side end of the platen glass 23. The cover member 27 is in contact with the upper surface of the platen glass 23, interposing the white reference member 29 between the platen glass 23 and the cover member 27. The cover member 27 and the white reference member 29 are disposed above the home position of the line sensor 31.

A right side end of the cover member 27 is defined as a position for contacting one end of a sheet of a document P. An upper surface of the cover member 27 has marks of each document size indicating positions on the platen glass 23 for positioning a document to be read. That is, the cover member 27 functions as a member for positioning a document to be read on the platen glass 23. A region of the upper surface of the platen glass 23 which is not covered by the cover member 27 and is exposed on an upper portion of the main body 20 will hereinafter be referred to as a "document placing table 23a". In the present embodiment, a document to be read is placed on the document placing table 23a.

The white reference member 29 provided on the rear surface of the cover member 27 is formed with a white-colored member having a length corresponding to that of the line sensor 31 and being oriented in the main scanning direction. The white reference member 29 is disposed opposite to the platen glass 23. The white reference member 29 is fixed to a prescribed position on the platen glass 23 by the cover member 27. The white reference member 29 is used to generate necessary compensation data when information of electric charges accumulated in the line sensor 31 is converted into a pixel value Y, as will hereinafter be described in detail.

The line sensor 31 is disposed below the platen glass 23 and movably supported by the belt conveying section 35 in the auxiliary scanning direction (in a right-to-left direction). The line sensor 31 has a light receiving surface having a length substantially the same as that of the platen glass 23 in the main scanning direction. The line sensor 31 is configured to read the document P placed on the platen glass 23 on a line-by-line basis, as is conventionally known.

Figure 2:
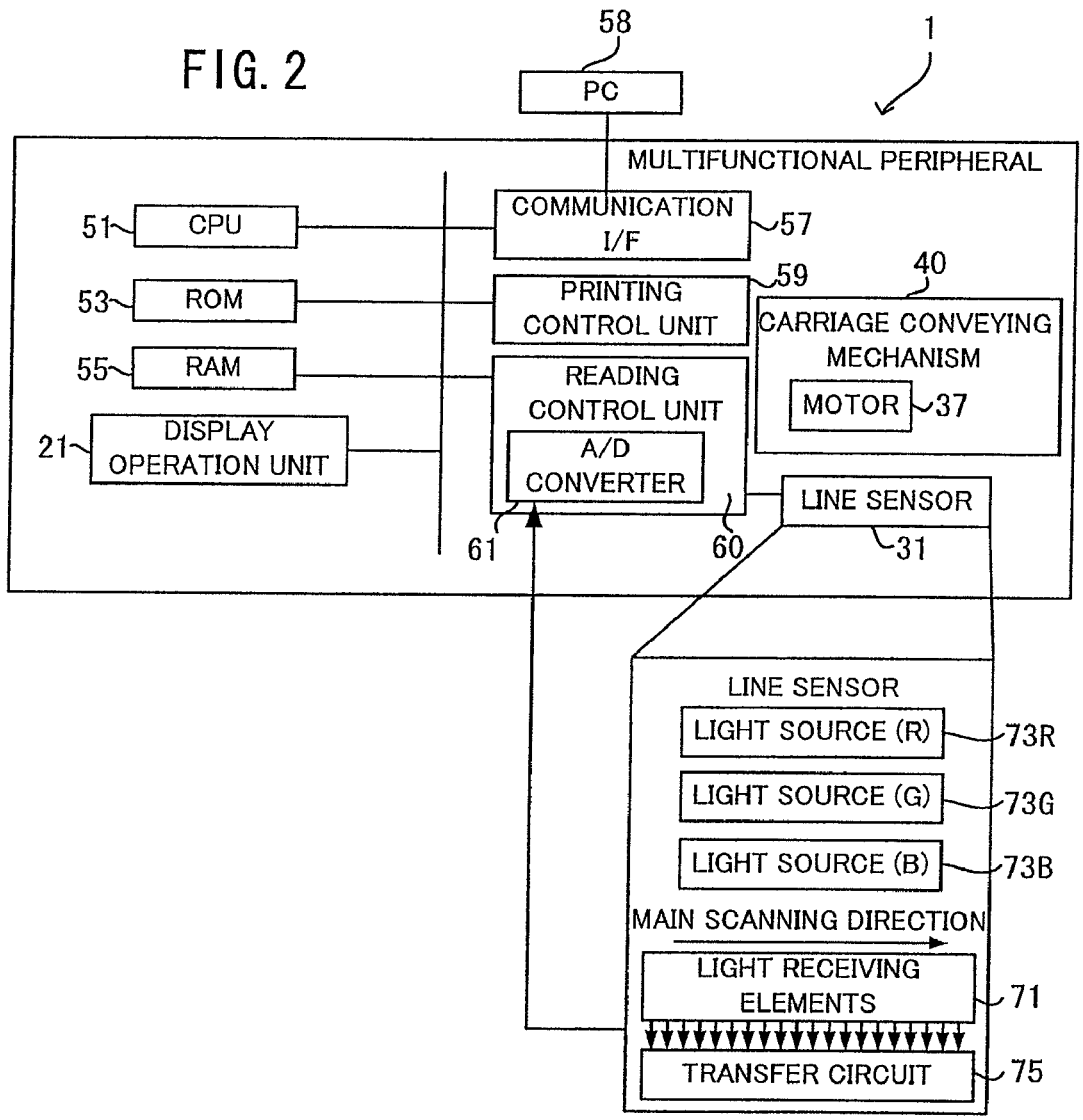
FIG. 2 is a block diagram showing an electrical arrangement of the multifunction peripheral.

The line sensor 31 has a set of light receiving elements 71 and light sources 73R, 73G, and 73B aligned in the main scanning direction (refer to FIG. 2). By irradiating the platen glass 23 with light from the light sources 73R, 73G, and 73B, specifically, and receiving reflected light from the document on the platen glass 23 in the light receiving elements, the line sensor 31 reads the document in the main scanning direction. As a result, the line sensor 31 generates line data including a set of electric charge information of pixels aligned along a line in the main scanning direction. Further, the line sensor 31 is accommodated in the housing 25 in a state that the line sensor 31 is mounted on the carriage 33.

The carriage 33 is fixed to a belt 35*c* stretched around a pair of rollers 35*a* and 35*b* of the belt conveying section 35 and moves towards the auxiliary scanning direction in association with a rotational movement of the belt 35*c* driven by the motor 37. That is, the line sensor 31 is moved back and forth in the auxiliary direction together with the carriage 33 conveyed by the belt conveying section 35. A structure having the carriage 33, the belt conveying section 35, and the motor 37 will hereinafter be referred to as a "carriage conveying section 40".

Next, an electrical arrangement of the multifunction peripheral 1 will be described while referring to FIG. 2. As shown in FIG. 2, the multifunction peripheral 1 includes a CPU (central processing unit) 51, a ROM (read-only memory) 53, a RAM (random access memory) 55, a communication interface 57, a display operation unit 21, a printing control unit 59, and a reading control unit 60.

The CPU 51 governs each unit of the device by executing programs stored in the ROM 53 and realizes the scanner function, the printer function and the copier function. Further, the RAM 55 is used as a work area when the CPU 51 executes the programs.

The display operation unit 21 is controlled by the CPU 51. The display operation unit 21 displays various information on the liquid crystal display and is used for inputting operational information into the CPU 51 with the operating switches provided thereon.

The communication interface 57 is used for communicating with a remote personal computer 58. The multifunction peripheral 1 receives a print command from the personal computer 58 through the communication interface 57, and provides the personal computer 58 with read image data formed through implementation of the scanner function.

The printing control unit 59 controls a motor and the recording head constituting the printing section, and forms an image on recording paper based on inputted data for printing.

The reading control unit 60 controls both the line sensor 31 and the motor 37 of the carriage conveying section 40. The multifunction peripheral 1 drives the motor 37 of the carriage conveying section 40 via the reading control unit 60 so as to move the line sensor 31 in the auxiliary scanning direction. The line sensor 31 performs a reading operation on a line-by-line basis while the line sensor 31 is moving, and reads a document placed on the document placing table 23*a*, as will hereinafter be described in detail.

The line sensor 31 controlled by the reading control unit 60 is well known in the art. The line sensor 31 has three light sources 73R, 73G, 73B, from which red (R), green (G), and blue (B) lights are emanated. The line sensor 31 further includes a plurality of light receiving elements aligned in the main scanning direction for receiving light reflected from the document placed on the platen glass 23. The line sensor 31 still further includes a transfer circuit 75 for transferring electric charges accumulated in the light receiving elements.

The transfer circuit 75 has an analog shift register which retains electric charges accumulated in each of the light receiving elements and sequentially outputs information about the accumulated electric charges as line data. The light sources 73R, 73G, and 73B irradiate light toward a mirror (not shown). The light reflected from the mirror is a line-shaped which is directed upward and extends in the main scanning direction. The light sources 73R, 73G, and 73B sequentially irradiate light onto the document placed on the platen glass 23 so that the light reflected from the document is received at the set of the light receiving elements aligned in the main scanning direction.

The line sensor 31 has a structure capable of reading a document with a resolution selected from a plurality of different resolutions in the main scanning direction. In the line sensor 31, the light receiving elements are aligned in the main scanning direction with distance intervals corresponding to the maximum reading resolution R_MAX.

Figure 3A:
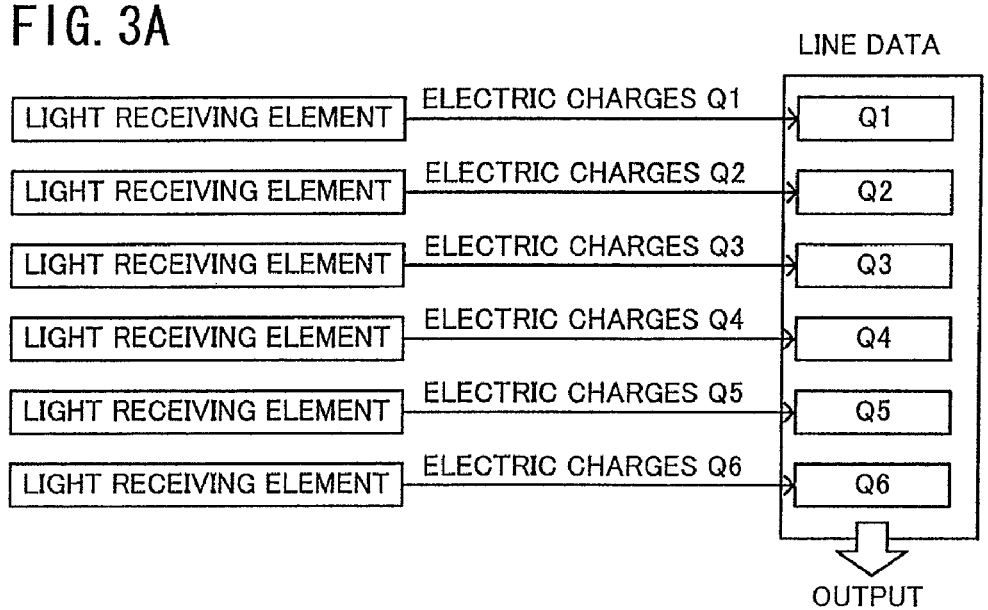
FIG. 3A is an explanatory diagram exemplarily showing generation of line data in a line sensor when the maximum reading resolution R_MAX is applied.

Specifically, the line sensor 31 is capable of reading a document with the maximum resolution R_MAX and one-$N^{th}$ (1/N) of the maximum reading resolution R_MAX where N is a positive integer. If the maximum reading resolution R_MAX is applied, as shown in FIG. 3A, each light receiving element serves as one pixel, and the line data made up of information about the electric charges accumulated in each light receiving element is generated and retained in the transfer circuit 75.

Figure 3B:
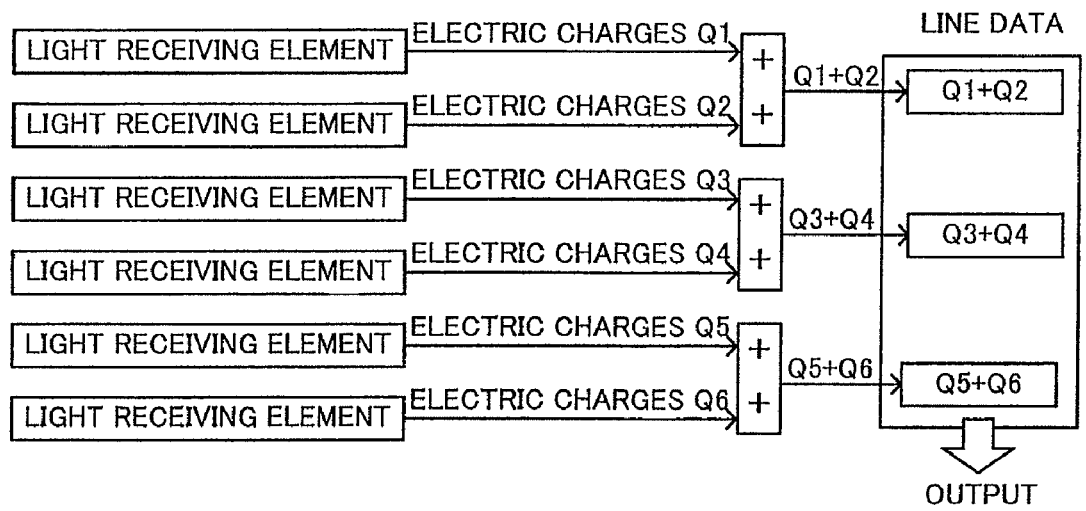
FIG. 3B is an explanatory diagram showing another generation of the line data in the line sensor when one-half of the maximum reading resolution R_MAX (R_MAX/2) is applied.

If the one-$N^{th}$ (1/N) reading resolution with respect to the maximum reading resolution R_MAX is applied, as shown in FIG. 3B, the consecutively arranged N-number light receiving elements are grouped en bloc and the electric charges retained in the N-number light receiving elements are combined (added) in the transfer circuit 75 to provide pixel data. The line data is made up of a set of pixel data and retained in the transfer circuit 75.

The line sensor 31 generates the line data with respect to the reading resolution as selected, and inputs the line data into the reading control unit 60 through the transfer circuit 75. The reading control unit 60 has an A/D converter 61 in which analog line data outputted from the line sensor 31 is converted into digital line data.

Next, an outline of a document copying process will be described while referring to FIG. 4. When a user inputs a copy command via the display operation unit 21, the line sensor 31 reads the white reference member 29 at the home position and a light amount to be outputted from each of the light sources 73R, 73G, and 73B is determined (Process 1).

The light amount is determined as a function of an inputted voltage applied to each of the light sources 73R, 73G, and 73B and a duration of time at which each of the light sources 73R, 73G, and 73B is lit. In the present embodiment, when a document is read, a leading portion of the document is firstly read with the pre-scan, and then, the entire document is read with the main-scan. In the process 1, reading the white reference member 29 is performed to determine an optimum light amount to be outputted at the time of the main-scan. An optimum light amount to be outputted at the time of the pre-scan is calculated based on the optimum light amount for the main-scan.

After determining the optimum light amounts for both the main-scan and the pre-scan, the carriage conveying mechanism 40 conveys the line sensor 31 (the carriage 33) to a start position (Process 2). Having reached the start position, the line sensor 31 starts the document reading operation from the start position to the end of a pre-scanning region. The document reading operation is performed at regular intervals on a line-by-line basis. When a line on the document is read, the line sensor 31 is held stationary (Process 3). The period of time at which the line sensor 31 is held stationary is so short that the line sensor 31 is seen to be moving at a constant speed in the auxiliary scanning direction.

The pre-scan is performed on a line-by-line basis. All the pixels on the same line are spaced apart a distance determined by the reading resolution for the pre-scan and are read substantially simultaneously. The pre-scan reading resolution is set in advance at a design phase of the multifunction peripheral 1. In performing the pre-scan, the light sources 73R, 73G, and 73B are sequentially turned on one after another each for a duration of time determining the optimum amount of light for the pre-scan as determined in process 1.

The pre-scanning region is set to an area between the start position and 3 cm away from the start position in the auxiliary scanning direction. As described above, in the pre-scan, only the leading portion of the document placed on the document placing table 23a is read by the line sensor 31. In the present embodiment, the size of a document and the orientation of the document are detected as information on about the document placed on the document placing table from the reading results obtained by the pre-scan. A main-scanning region to be read at the time of the main-scan is determined, for example, based on the detected size of the document.

When the line sensor 31 has reached the end of the pre-scanning region, the line sensor 31 is moved backward to a position upstream of the start position (Process 4). Then, the carriage conveying mechanism 40 conveys the line sensor 31 (the carriage 33) to the start position from the upstream position. Then, the main-scan is performed by moving the line sensor 31 from the start position to the end of the main-scanning region (Process 5). The main-scan is performed in the same way as in the sub-scan except for the region of the document to be scanned and the reading resolution. That is, the main-scan is also performed on a line-by-line basis in which all the pixels on the same line are spaced apart a distance determined by the reading resolution for the main-scan. The light sources 73R, 73G, and 73B are also sequentially turned on one after another each for a duration of time determining the optimum amount of light for the main-scan as determined in process 1.

As described above, the multifunction peripheral 1 controls the line sensor 31 to read the pixels spaced apart a distance corresponding to the main-scan reading resolution designated by the user and to generate the line data.

In response to the copy command, a printing section (not shown) of the multifunction peripheral 1 prints an image of the original document on a recording paper based on the main-scan data representing an entire image on the original document.

Next, a copy process executed by the CPU 51 will be described while referring to the flowcharts illustrated in FIGS. 5 and 6. The copy process is executed when the display operation unit 21 receives the copy command. In the present embodiment, either a color copy command for instructing to make a color copy or a monochromatic copy command for instructing to make a monochromatic copy is inputted as the copy command. When the copy command is inputted, information about the reading resolution designated by the user is inputted. This reading resolution is used as a reading resolution RM for the main-scan.

In the copy process shown in FIG. 5, the CPU 51 controls the reading section 3 and the printing section (not shown) via the reading control unit 60 and the printing control unit 59, respectively, and forms a copy image of an original document on a recording paper.

Figure 7A:
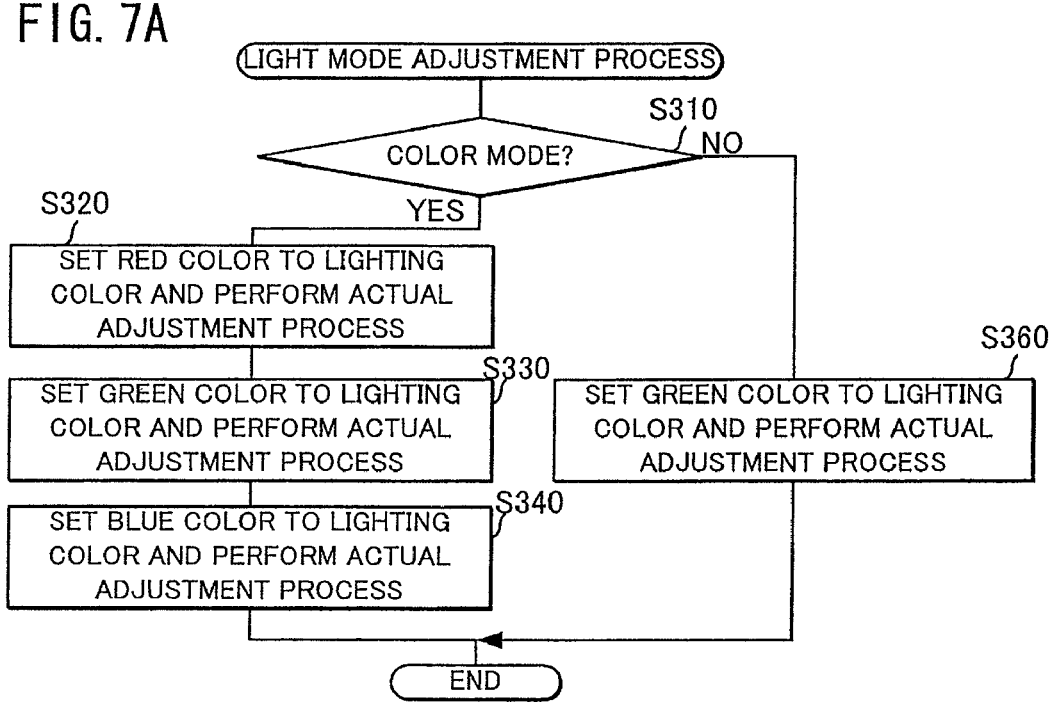
FIG. 7A is a flowchart illustrating steps in a light amount adjustment process performed in the reading control unit.

Upon starting the copy process, the CPU 51 controls the reading control unit 60 to perform a light amount adjustment process and locates the line sensor 31 at the home position as shown in FIG. 7A (S110). Assuming that the reading unit outputs digitally converted values ranging from 0 to 255, in the light amount adjustment process, light reflected from the white reference member is applied to the reading unit while gradually reducing the light amount from the specific light source from the maximum level. If an undue amount of light is received at the light receiving elements, the output value of the reading unit remains at 255 and is saturated. A light amount at the time when the reading unit is not saturated needs to be obtained as the optimum amount of light to be emanated from the specific light source. It should be noted that the light amount from the specific light source is typically changed by changing the intensity of light and/or duration of time at which the light source is being lit.

Specifically, in S110 of the flowchart shown in FIG. 5, main-scan reading mode and main-scan reading resolution are set to input parameters used in the light amount adjustment process, and the CPU 51 controls the reading control unit 60 to perform the light amount adjustment process. More specifically, if the inputted copy command is the color copy command, the reading mode is set to a color mode whereas if the inputted copy command is the monochromatic copy command, the reading mode is set to a monochromatic mode. Further, the reading resolution designated at the time of inputting the copy command is set to the input parameter, and the CPU 51 controls the reading control unit 60 to perform the light amount adjustment process in accordance with the designated main-scan reading resolution.

Referring to the flowchart shown in FIG. 7A, upon starting the light amount adjustment process, the reading control unit 60 judges whether the reading mode set in the input parameter is the color mode. If the reading control unit 60 judges that the reading mode is the color mode (S310: YES), the routine advances to S320. If, on the other hand, the reading control unit 60 judges that the reading mode is the monochromatic mode (S310: NO), the routine advances to S360.

Figure 7B:
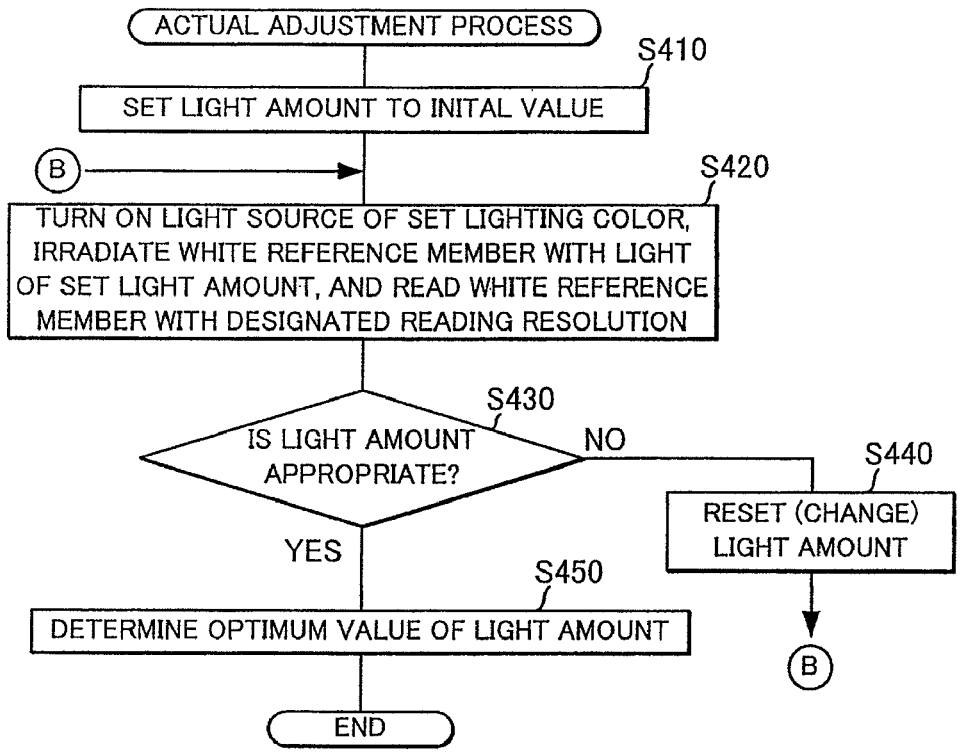
FIG. 7B is a flowchart illustrating steps in an actual adjustment process performed in the reading control unit.

In S320, the reading control unit 60 selects a red light source 73R and performs an actual light amount adjustment process shown in FIG. 7B with the reading resolution set in the input parameter.

Upon starting the actual light amount adjustment process, the reading control unit 60 sets an initial light amount value determined in advance at the design phase of the multifunction peripheral 1 (S410). The reading control unit 60 sets the line sensor 31 to read the document with the reading resolution set in the input parameter, and controls the line sensor 31 to reset the electric charges accumulated in the light receiving elements and to start accumulating newly generated electric charges in the light receiving elements. At this time, the reading control unit 60 turns on the selected light source so that light is outputted therefrom for the optimum amount as set.

After turning off the light source, that is, after generating the light amount from the light source, the reading control unit 60 acquires from the line sensor 31 line data generated under the reading resolution set in the input parameter (S420). The thus acquired line data indicates the electric charges accumulated in the light receiving elements during the period of time when the light source has been lit. (S420). At this time, the line sensor 31 is at the home position where it faces the white reference member 29. Accordingly, the line data outputted from the line sensor 31 indicates the white reference member 29 read with the as-set light amount and the reading resolution.

The reading control unit 60 judges whether the as-set light amount is appropriate. To this effect, the reading control unit 60 refers to the digitally converted value of each pixel on the white reference member 29 (S430). A variety of methods is available for determining if the as-set light amount is appropriate. For example, in S430, if none of the digitally converted values of the pixels acquired as the line data are saturated, judgment is made so that the as-set light amount is appropriate. If the line data indicates that the digitally converted value of any one of the pixels is saturated, the reading control unit 60 judges that the set light amount is not appropriate. It should be noted that assuming that the reflected amount of light from one pixel is represented by any one of 256 gradations (0 to 255) with 8-bit data, the as-set light amount is determined to be inappropriate if any one of the pixels takes the maximum value (255).

If the reading control unit 60 judges that the light amount is not appropriate (S430: NO), the reading control unit 60 sets the light amount to a value different from the currently set value (S440), controls the line sensor 31 to read the white reference member 29 with the newly set light amount (S420), and judges whether the newly set light amount is appropriate based on the line data resulting from the newly set light amount. (S430).

If the reading control unit 60 judges that the light amount is still not appropriate (S430: NO), the routine advances to S440. The reading control unit 60 repeats the same process until the light amount becomes appropriate. If the reading control unit 60 now finds that the light amount is appropriate (S430: YES), the reading control unit 60 determines the currently set light amount as an optimum value LX of the light amount (S450), whereupon the actual light amount adjustment process is ended.

In the actual light amount adjustment process, in order to seek for the appropriate light amount in which none of the digitally converted values of the pixels in the line data are saturated, the light amount is gradually reduced from the largest value to the smallest value. For example, in case of the characteristic curve <<1>> shown in FIG. 8, the light amount is too large and the values of a part of the pixels are saturated as indicated by dotted line. In such a case, the light amount is reduced to a level shown in <<2>> of FIG. 8, and seeks for the light amount that none of the values of the pixels are saturated. It should be noted that there are variations in the characteristic of the light receiving elements arranged along the widthwise direction of the document or the main scanning direction. Accordingly, receiving the same amount of light at all the light receiving elements does not necessarily result in the same level output from the light receiving elements. When the outputs from some light receiving elements show the maximum values (255) while the outputs from other light receiving elements do not, it is assumed that the light receiving elements that showed the maximum value received an undue amount of light, causing such light receiving elements to saturate. In such a case, the light amount emanated from the light source needs to be reduced.

In the actual light amount adjustment process, the light amount from the light source is adjusted for the reasons stated above, and the optimum value LX of the light amount is obtained with the process shown in FIG. 7B.

Upon completion of the light amount adjustment process for the red color light source 73R in S320, the routine advances to S330 where a green color is set as the lighting color. The reading control unit 60 performs the actual light amount adjustment process with the reading resolution set in the input parameter and determines the optimum value of the light amount from the green color light source 73G. Further, the reading control unit 60 sets a blue color as the lighting color. The reading control unit 60 performs the actual light amount adjustment process with the reading resolution set in the input parameter and determines the optimum value of the light amount from the blue color light source 73B (S340), whereupon the light amount adjustment process is ended.

In S360, the reading control unit 60 sets the green color as the lighting color. The reading control unit 60 performs the actual light amount adjustment process with the reading resolution set in the input parameter and determines the optimum value of the light amount from the green color light source 73G, whereupon the light amount adjustment process is ended.

Referring back to the flowchart shown in FIG. 5, in S110, the CPU 51 obtains from the reading control unit 60 the result of the light amount adjustment process. If the color copy command is inputted by the user, the CPU 51 adopts the optimum value LX_R of the light amount of the red color light source 73R, the optimum value LX_G of the light amount of the green color light source 73G, and the optimum value LX_B of the light amount of the blue color light source 73B determined through the process between S320 and S340 as the light amount LM for use in the color main-scan.

If the monochromatic copy command is inputted by the user, the CPU 51 adopts the optimum value LX_G of the light amount of the green color light source 73G determined by the process in S360 as the light amount LM for used in the monochromatic main-scan. The reason for adopting only the optimum value LX_G of the light amount of the green color light source 73G as the light amount LM for the monochromatic main-scan is that only the green color light source 73G is used for the monochromatic scan.

Upon completing the process in S110, the routine advances to S120 or S125. Specifically, if the color copy command is inputted, the CPU 51 makes a negative decision in S115, and the routine advances to S120. If the monochromatic copy command is inputted, the CPU 51 makes an affirmative decision in S115, and the routine advances to S125.

In S120, the CPU 51 determines the light amount LP to be set when the pre-scan is performed based on the light amount LM for the main-scan determined in S110. Specifically, with respect to each of red, green, and blue colors, the CPU 51 determines the light amount LP for the pre-scan based on the reading resolution RM of the main-scan, the reading resolution RP of the pre-scan, and the light amount LM for the color main-scan in accordance with the following formula.

$$LP = k \cdot LM \cdot RP/RM$$

It should be noted that a coefficient k is a positive real number and is smaller than one (1). In the line sensor 31, if the reading resolution is 1/N of the maximum reading resolution R_MAX, the electric charges accumulated in N-number light receiving elements are combined or added to thereby generate the line data in the case of the 1/N reading resolution with respect to the maximum reading resolution. The relationship between the light amount LP to be outputted at the time of the pre-scan and the light amount LM to be outputted at the time of the main-scan can be theoretically represented by LP=LM·RP/RM. However, in practice, even if the light amount LP of the pre-scan is set in accordance with the relationship noted above, several factors may cause the values of the line data generated from the line sensor 31 to be saturated.

In the present embodiment, the coefficient k restrains the light amount so as to prevent the values of the line data from being saturated at the time of the pre-scan. The coefficient k may be defined at the design phase by experiment and, for example, may be set to k=0.8.

Here, the process in S120 will be described in detail. In S110, the CPU 51 sets the optimum light amount LX_R of the red color light source 73R to be the light amount LM_R when performing the main-scan (LM_R=LX_R), the optimum light amount LX_G of the green color light source 73G to be the light amount LM_G when performing the main-scan (LM_G=LX_G), and the optimum light amount LX_B of the blue color light source 73B to be the light amount LM_B when performing the main-scan (LM_B=LX_B).

In S120, the CPU 51 determines the light amount LP for the per-scan as follows, in which α=k·RP/RM.

That is, as the light amount LP of the pre-scan, the CPU 51 determines that the light amount LP_R of the red color light source 73R is to be LP_R=α·LM_R, the light amount LP_G of the green color light source 73G is to be LP_G=α·LM_G, and the light amount LP_B of the blue color light source 73B is to be LP_B=a·LM_B. Upon completing the process in S120, the routine advances to S130.

In S125, the CPU 51 sets in the input parameters the reading mode and the reading resolution both applied at the time of performing the pre-scan, and controls the reading control unit 60 to perform the light amount adjustment process. Specifically, at the time of the pre-scan, in order to read a document with the color mode, the color mode is set as the reading mode and the reading resolution of the pre-scan preliminary given at the design phase of the multifunction peripheral is set as the reading resolution. Then, the CPU 51 controls the reading control unit 60 to perform the light amount adjustment process.

At the time of the pre-scan, it is not necessary for reading a document with a high reading resolution. Hence, the lowest reading resolution applicable to the line sensor 31 is selected as the reading resolution of the pre-scan. For example, if the reading resolutions applicable to the line sensor 31 are 1200 dpi, 600 dpi, and 300 dpi, 300 dpi is selected as the reading resolution of the pre-scan.

In S125, the CPU 51 acquires the results of the light amount adjustment process performed by the reading control unit 60. The CPU 51 determines the optimum value LX_R of the light amount of the red color light source 73R, the optimum value LX_G of the light amount of the green color light source 73G, and the optimum value LX_B of the light amount of the blue color light source 73B determined by the process between S320 and S340 in the light amount adjustment process, as the light amount LP of the pre-scan. Then, the routine advances to S130.

In S130, the CPU 51 acquires white data for the main-scan via the reading control unit 60. Specifically, the CPU 51 controls the line sensor 31 to read the white reference member 29 with the light amount of the main-scan and the reading resolution of the main-scan determined as above. The CPU 51 acquires the line data generated from the line sensor 31 as the white data for the main-scan.

If the reading mode of the main-scan is the color mode, with respect to each of the red, green and blue colors, the CPU 51 controls the light sources 73R, 73G, and 73B to sequentially turn on, and acquires the white data of each color. If the reading mode of the main-scan is the monochromatic mode, the CPU 51 controls the green color light source 73G to turn on, and acquires the white data with respect to the green color.

Upon completing the process in S130, the routine advances to S135 where the CPU 51 acquires the white data for the pre-scan via the reading control unit 60. Specifically, the CPU 51 controls the line sensor 31 to read the white reference member 29 with the light amount of the pre-scan and the reading resolution of the pre-scan determined as above for each of the red, green, and blue colors. The CPU 51 acquires the line data generated from the line sensor 31 as the white data for the pre-scan (S135).

Upon completing the process in S135, the routine advances to S140 where the CPU 51 acquires black data for the main-scan. Specifically, the CPU 51 controls the line sensor 31 to read the white reference member 29 with the reading resolution of the main-scan, without turning on the light sources 73R, 73G and 73B. The CPU 51 acquires the line data generated from the line sensor 31 as the black data for the main-scan.

Upon completing the process in S140, the routine advances to S145 where the CPU 51 acquires the black data for the pre-scan. Specifically, the CPU 51 controls the line sensor 31 to read the white reference member 29 with the reading resolution of the pre-scan, without turning on the light sources 73R, 73G, and 73B. The CPU 51 acquires the line data generated from the line sensor 31 as the black data for the pre-scan.

Upon completing the process in S145, the routine advances to S150 where the CPU 51 controls the carriage conveying mechanism 40 to convey the line sensor 31 to the start position from the home position via the reading control unit 60. The CPU 51 controls the reading control unit 60 to control the motor 37 of the carriage conveying mechanism 40 so as to accelerate the conveying speed of the line sensor 31 (the carriage 33) to reach the predetermined speed at the start position.

During conveyance of the line sensor 31 by the carriage conveying mechanism 40, the CPU 51 generates compensation data for the pre-scan used for the shading compensation and black compensation, based on the white data and the black data for the pre-scan obtained in S135 and S145 (S155).

As shown in FIG. 9A, the CPU 51 calculates a shading compensation amount $\beta$ and a black compensation amount $\gamma$ for each pixel in the main scanning direction, and generates the compensation data in which the shading compensation amount $\beta$ and the black compensation amount $\gamma$ are described for each pixel in the main scanning direction.

In S155, with respect to each pixel, the CPU 51 obtains the shading compensation amount $\beta$ from a value DW indicated by the white data and a value DB indicated by the black data, in accordance with a formula $\beta=(E-1)/(DW-DB)$, and obtains the black compensation amount $\gamma=DB$. A variable E used here represents a gradation number of the read image data generated as a result of reading the document.

It is now assumed that a value of each pixel of the line data is represented by 8-bit data with regard to a pixel having DW which is the value indicated by the white data and equals to, for example, 230, that is, DW=230 and having DB which is the value indicated by the black data equals to, for example, 10, that is, DB=10. In such a case, even if a document is read by the line sensor 31, the value of the pixel can have a value between 230 and 10, as shown in FIG. 9B.

The values DW and DB vary on a pixel-by-pixel basis due to variation in characteristic of the light receiving elements and variation in background light entered from outside. Accordingly, the value of each pixel making up the line data may result in different values if no compensation is made even if documents having the same color are read.

For this reason, in the present embodiment, the values of the line data outputted from the line sensor 31 are converted by the shading compensation and the black compensation, for example, into the values of the gradation number E=256. The shading compensation amount $\beta$ and the black compensation amount $\gamma$ are used for this conversion.

When the value of the line data outputted from the line sensor 31 is X, the value Y of a pixel after implementation of the shading compensation and the black compensation is represented by $Y=\beta \cdot (X-\gamma)$. In S155, the CPU 51 generates the compensation data for the pre-scan during a period of time from when the line sensor 31 leaves the home position until the line sensor 31 reaches the start position. When the line sensor 31 has reached the start position, the CPU 51 controls the reading control unit 60 to perform the pre-scan of a document placed on the document placing table 23a with the previously calculated light amount for the per-scan (the light amount determined in S120 or S125)(S160).

Specifically, the CPU 51 controls the carriage conveying mechanism 40 to convey the line sensor 31 at a constant speed in the auxiliary scanning direction from the start position to the end of the pre-scanning region. The start position is adjacent to the right end of the cover member 27 and is a position with which the document is brought into contact. In the pre-scanning region, the CPU 51 controls the line sensor 31 to perform the reading operation at predetermined time intervals. When the pre-scan is performed, the line sensor 31 is controlled to perform the reading operation with the predetermined reading resolution.

The CPU 51 controls the line sensor 31 to perform the color reading operation at intervals corresponding to the reading resolution by turning on the light sources 73R, 73G, and 73B sequentially. A period of time during which each light source is turned on is set so as to give the previously calculated light amount for the pre-scan.

Figure 10A:
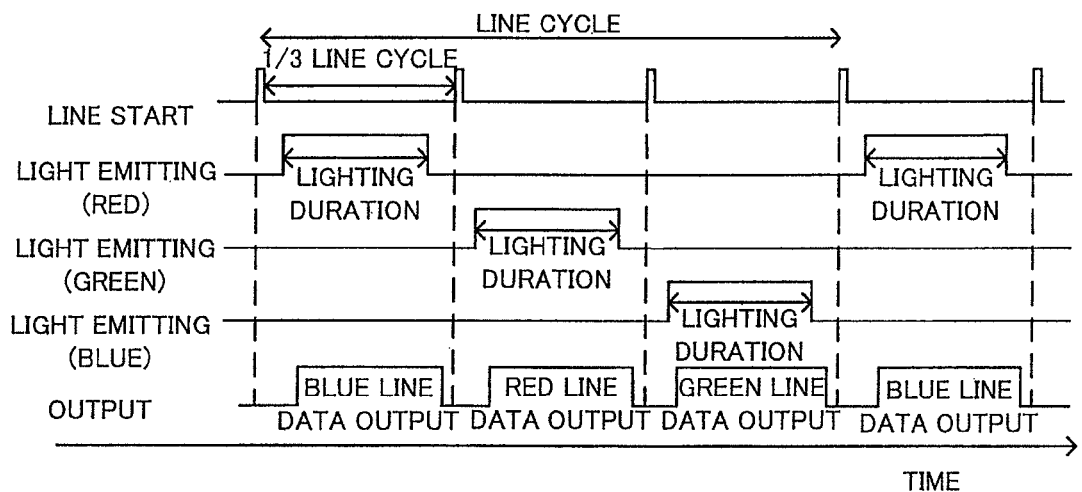
FIG. 10A is a time chart showing timings of a control signal inputted into the line sensor from the reading control unit at the time of color reading operation.

The reading control unit 60 inputs a line start signal and lighting control signals with respect to the light sources 73R, 73G, and 73B at timings shown in FIG. 10A. As shown in FIG. 10A, the reading control unit 60 inputs the line start signals into the line sensor 31 at time intervals equal to one-third (⅓) of a line scanning period, and the line sensor 31 is controlled to perform the reading operation at the same time intervals.

When the line start signal is inputted into the line sensor 31, the line sensor 31 inputs the electric charges ever accumulated in the light receiving elements into the transfer circuit 75. Concurrently with the transfer of the electric charges, the light receiving elements are reset and then starts another charge accumulating operation (the reading operation) in which newly produced electric charges are accumulated in the light receiving elements. At this time, information about the electric charges inputted into the transfer circuit 75 is outputted as the line data to the reading control unit 60 from the line sensor 31. The output of the information to the reading control unit 60 is completed before the next line start signal is inputted.

Further, upon inputting the line start signal into the line sensor 31, the reading control unit 60 inputs the lighting control signal into the line sensor 31 as shown in FIG. 10A. The reading control unit 60 sequentially turns on the light sources 73R, 73G and 73B corresponding to the lighting colors of red, green and blue during the period of time corresponding to the predetermined light amount. Turning on the light sources 73R, 73G and 73B are switched one after another at intervals of one-third (⅓) of a line scan period.

Hence, the line sensor 31 sequentially outputs the line data indicative of the reading results of the document by the red color light source 73R (hereinafter referred to as "red line data"), the line data indicative of the reading results of the document by the green color light source 73G (hereinafter referred to as "green line data"), and the line data indicative of the reading results of the document by the blue color light source 73B (hereinafter referred to as "blue line data") at intervals of one-third of a line scan period.

The CPU 51 is applied with color line data including the red line data, the green line data, and the blue line data inputted from the reading control unit 60, and provides color read image data.

In S160 of the flowchart shown in FIG. 5, the CPU 51 performs the shading compensation and the black compensation for a value X of each pixel in the red line data using the pre-scan compensation data with respect to the red color light source 73R, and converts the value X into a value Y.

In the same manner as described above, the value X of each pixel in the green line data and the value X of each pixel in the blue line data are converted into values Y based on the pre-scan compensation data with respect to corresponding colors.

The converted red, green and blue line data forms color line data. A set of the color line data forms color pre-scan data generated through the reading operation of the pre-scanning region.

The pre-scan data generated in S160 is the read image data indicative of the reading results of the pre-scanning region. The pre-scan data contains information about the number of pixels corresponding to the reading resolution of the pre-scanning region. The information about the number of pixels is image information of the document placed on the document placing table 23a. The CPU 51 detects an edge of the document from the pre-scan data.

Upon completing the process in S160, the CPU 51 controls the carriage conveying mechanism 40 via the reading control unit 60 to start conveying the line sensor 31 in a reverse direction. Specifically, the CPU 51 controls the carriage conveying mechanism 40 to convey the line sensor 31 to a position upstream from the start position by a predetermined distance (S165).

Further, upon controlling the carriage conveying mechanism 40 to start conveying the line sensor 31 in the reverse direction, the routine advances to S170. In S170, the CPU 51 judges whether execution of an angle modification is permitted. If the CPU 51 judges that the execution of the angle modification is permitted (S170: YES), the routine advances to S181. If the CPU 51 judges that the execution of the angle modification is not permitted (S170: NO), the routine advances to S171.

The term "angle modification" as used herein means a function for correcting the orientation of a document placed on the document placing table 23a and for printing an image of the original document on a recording paper as if the document is placed in right orientation. The multifunction peripheral 1 according to the present embodiment allows a user to select either "permission" or "prohibition" regarding the execution of the angle modification. Selection can be made through the display operation unit 21.

In S171, the CPU 51 analyses the pre-scan data obtained by the process in S160, specifies the width of the document in the main scanning direction, and judges the size of the document based on the width.

That is, the use of an image filter, which is well known in the art, can convert the pre-scan data into edge image data. The edge image data provides the edge of the document and specifies the width of the document in the main scanning direction. Assuming that the width of the document in the main scanning direction is a shorter side of the document and that the document placed on the document placing table 23a is of a standard-sized, the size of the document placed on the document placing table 23a can be identified.

After having determined the size of the document, the CPU 51 assumes the document having the detected size to be properly placed on a prescribed position on the document placing table 23a, and determines a region of the document placing table 23a where the main-scan is to be performed (S173). Specifically, the CPU 51 determines that a position away from the start position by a distance corresponding to a longer side of the document in the auxiliary scanning direction is to be an end position of the main-scanning region, and defines the main-scanning region to be a region between the start position and the end position.

Upon completing the process in S173, the CPU 51 judges whether an automatic variable magnification function is permitted to operate (S175). The automatic variable magnification function means a function to enlarge or reduce the size of a copy image in accordance with the size of recording paper, and to print the image on the recording paper with the enlarged/reduced size. The multifunction peripheral 1 according to the present embodiment allows the user to select either "permission" or "prohibition" of the operation of the automatic variable magnification function through the display operation unit 21.

If the CPU 51 judges that the automatic variable magnification function is permitted to operate (S175: YES), the routine advances to S177. If the CPU 51 judges that the automatic variable magnification function is not permitted to operate (S175: NO), the routine advances to S190 without performing the process in S177.

In S177, the CPU 51 sets a variable magnification ratio from a ratio of the size of the document determined in S171 to the size of the recording paper supplied in a recording position via the printing section. Then, the routine advances to S190.

When the CPU 51 judges that the angle modification function is permitted to operate (S170: YES) and then the routine advances to S181, the CPU 51 analyses the pre-scan data obtained in the process in S160 and judges an inclined angle of the document. That is, the CPU 51 converts the pre-scan data into the edge image data with the use of a filter, detects the edge of the document from the edge image data, and judges the inclined angle of the document from the pattern of the edge of the document based on an angle that the document is properly placed.

Upon completing the process in S181, the routine advances to S183 where the CPU 51 determines a rotation correction amount based on the inclined angle of the document detected in S181. The rotation correction amount represents a rotation amount used when implementing rotation processing of the read image data. In S183, the rotation correction amount is so determined that when the rotation processing is implemented, an image of the document is disposed in an upright position in a proper direction.

Upon completing the process in S183, the routine advances to S185. In S185, assuming that the document having a size inputted by the user through the display operation unit 21 is disposed on the document placing table 23a and inclined from the proper direction with an amount corresponding to the inclined angle detected in S181, the CPU 51 determines that a region of the document placing table 23a on which the document is placed is the main-scanning region. Then, the routine advances to S190.

In S190, the CPU 51 controls the carriage conveying mechanism 40 through the reading control unit 60 to convey the line sensor 31 to the start position. At this time, the line sensor 31 has been staying at the upstream position away from the start position by the predetermined distance. That is, the CPU 51 instructs the reading control unit 60 to control the motor 37 of the carriage conveying mechanism 40 in such a way that the conveying speed of the line sensor 31 is accelerated to reach the predetermined speed at the start position.

Further, during a period of time from the start of movement of the line sensor 31 to the arrival time of the line sensor 31 at the start position, the CPU 51 generates the compensation data for the main-scan based on the white data and the black data for the main-scan obtained in S130 and S140, in the same manner as the process in S155 (S195). Specifically, if the reading mode of the main-scan is the color mode, the CPU 51 generates the compensation data for each of the red, green and blue colors. If the reading mode of the main-scan is the monochromatic mode, the CPU 51 generates the compensation data for the green color.

When the line sensor 31 reaches the start position, the CPU 51 controls the line sensor 31 through the reading control unit 60 to scan the main-scanning region. The CPU 51 converts the main-scan data or the read image data generated by the main-scan into printing data. Then, the CPU 51 controls the printing section through the printing control unit 59 to print a copy image of the original document on the recording paper (S200).

Specifically, the CPU 51 sets the reading resolution of the main-scan to the line sensor 31 via the reading control unit 60. Further, the CPU 51 controls the carriage conveying mechanism 40 to convey the line sensor 31 at a constant given speed in the auxiliary direction from the start position to the end of the main-scanning region. The conveying speed of the line sensor 31 is determined based on the reading resolution set for the main-scan. The line sensor 31 is controlled to perform the reading operation at regular time intervals corresponding to the reading resolution of the main-scan.

Each time the line sensor 31 performs the reading operation, the CPU 51 controls the line sensor 31 to perform the reading operation in color or in monochrome, at intervals corresponding to the reading resolution, by sequentially turning on the light sources 73R, 73G, and 73B for the time period and with the light intensity that determine the light amount at the time of the main-scan.

More specifically, if the color copy command is inputted, the line start signals and the lighting control signals with respect to each of the light sources 73R, 73G, and 73B are applied to the line sensor 31 at timing indicated in FIG. 10A. The line sensor 31 performs the reading operation during a period of time corresponding to one third (⅓) of a line scan period. The light sources 73R, 73g and 73B are sequentially turned on one after another at intervals equal to one third of the line scan period. When any one of the light sources 73R, 73G, and 73B is turned on, the optimum light amount as previously set is irradiated onto the document placed on the platen glass 23.

In the present embodiment, the voltage applied to the light sources 73R, 73G, and 73B is the same in both the main-scan and pre-scan but the duration of time the light sources are lit is made different in the main-scan and pre-scan, thereby producing the light amounts suitable for the main-scan and pre-scan.

With the above-described control, the red line data, the green line data, and the blue line data are sequentially outputted from the line sensor 31 at intervals equal to one third of a scan line period.

Further, at S200 of the flowchart shown in FIG. 6, the CPU 51 implements the shading compensation and the black compensation using the main-scan compensation data to compensate for the red line data, the green line data and the blue line data obtained from the line sensor 31. These compensations are implemented in the same manner as in the pre-scan. The red line data, green line data and blue line data which have been compensated for are treated as the color line data, and a set of the color line data is treated as the main-scan data. The main-scan data indicates the image on the original document red through the main-scan.

Figure 10B:
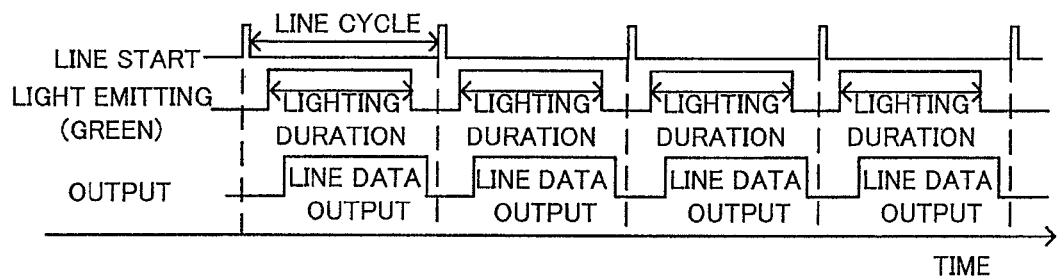
FIG. 10B is a time chart showing timings of the control signal inputted into the line sensor from the reading control unit at the time of monochromatic reading operation.

If the monochromatic copy command is inputted, the line start signals and the lighting control signals for the light source 73G are applied to the line sensor 31 at times indicated in FIG. 10B. At the time of the monochromatic reading operation, the red color light source 73R and the blue color light source 73B are not turned on but only the green color light source 73G.

As shown in FIG. 10B, the reading control unit 60 inputs the line start signals into the line sensor 31 at time intervals equal to a line scan period so as to control the line sensor 31 to perform the reading operation at regular time intervals. In timed relation with the application of the line start signal, the green color light source 73G is turned on. The optimum light amount as previously set with respect to the green color light source 73G is irradiated onto the document placed on the platen glass 23.

Hence, the line sensor 31 outputs the green line data indicative of the reading results of the document by the green color light source 73G at intervals equal to a line scan period. In S200, the CPU 51 performs the shading compensation and the black compensation using the compensation data of green color for the main-scan to compensate for the green line data obtained from the line sensor 31, and generates the monochromatic line data. A set of the monochromatic line data generated through the reading operation of the main-scanning region is treated as the main-scan data.

Further, as described above, in S200, the CPU 51 converts the monochromatic line data sequentially generated in accordance with the movements of the line sensor 31 into the printing data, inputs the printing data into the printing control unit 59, and controls the printing control unit 59 to perform image printing based on the printing data.

If the automatic variable magnification function is effectively operated, the CPU 51 processes the main-scan data to have effects of enlargement or reduction in size of the reproducible image in accordance with the predetermined variable magnification, and generates the printing data from the thus processed main-scan data. The CPU 51 inputs the printing data into the printing control unit 59 so that the copy image of the original document can be printed on the recording paper with the size fitting to the size of the recording paper.

For example, if a document to be read is A4 size and recording paper is B5 size, an A4 size image indicated by the main-scan data is reduced to B5 size so that the printing data suitable for printing on the B5 size recording paper is generated.

In contrast, if a document to be read is B5 size and recording paper is A4 size, a B5 size image indicated by the main-scan data is enlarged so that the printing data suitable for printing on the A4 size recording paper is generated If the angle modification function is effectively operated, the CPU 51 extracts region indicating the region where the document is placed from the main-scan data, processes the extracted data to have effects of rotation using the previously obtained rotation correction amount, generates the printing data based on the thus processed data.

In S200, while performing the above-described processes, the CPU 51 reads the main-scanning region by the line sensor 31, generates the main-scan data indicative of the read image of the entire document, and prints the copy image of the original document on the recording paper based on the main-scan data. Then, the CPU 51 controls the carriage conveying mechanism 40 to convey the line sensor 31 to the home position (S210), and ends the copy process.

As described, in the present embodiment, an optimum main-scan light amount from the light sources is determined by reading the white reference member 29, while an optimum pre-scan light amount is not determined as in the case for the main-scan but calculated based on the light amount for the main-scan in relation to the reading resolution.

According to the present embodiment, unlike the conventional art in which the pre-scan light amount is also determined by reading the white reference member, the multifunction peripheral 1 according to the present embodiment is capable of making copies of the original document at a high speed as the time for the pre-scan is shortened. Accordingly, improved performance of the multifunction peripheral 1 relative to the copier function can be attained.

Further, in the conventional art, after the pre-scan has been performed, the line sensor is once returned to the home position for determining the light amount for the main-scan. Accordingly, it is required that the line sensor travel between the home position and the start position more than once. According to the present embodiment, on the other hand, prior to performing the pre-scan, the light amount for the pre-scan as well as the light amount for the main-scan is determined. The line sensor 31 needs not to travel between the home position and the start position more than once until the main-scan is completed. Accordingly, the duration for conveying the line sensor 31 can be shortened as compared to the conventional art.

According to the above embodiment, after the pre-scan, the line sensor 31 is returned to the upstream position, the predetermined distance away from the start position. The reason to return the line sensor 31 to the upstream position is that the line sensor 31 is accelerated to the target speed until the line sensor 31 reaches the start position and the line sensor 31 is conveyed at a constant speed in downstream from the start position. The returned amount from the start point of the line sensor 31 is an amount necessary and sufficient for the acceleration, and it is not necessary to return the line sensor 31 to the home position. According to the present invention, the duration for conveying the line sensor 31 after the pre-scan can be reduced.

While the invention has been described in detail with reference to a specific embodiment thereof, it would be apparent to those skilled in the art that many modifications and variations may be made therein without departing from the spirit of the invention.

For example, according to the above-described embodiment, the light amount for the pre-scan is calculated in relation to the reading resolution and based on the light amount for the main-scan. However, a different type image sensor from that described above may need to determine the relationship between the light amount for the main-scan and the light amount for the pre-scan based on factors other than the reading resolution.

What is claimed is:

1. An image reading device comprising:
   a reading unit including a light source and a predetermined number of light receiving elements aligned in a first direction, the light source irradiating light onto an object to be read, at least a part of the predetermined number of light receiving elements receiving light reflected from the object, the reading unit outputting line data representing a line image on the object;
   a conveying section that conveys the reading unit in a second direction perpendicular to the first direction;
   a first light amount determining section configured to determine a first light amount to be emanated from the light source;
   a second light amount determining section configured to determine a second light amount to be emanated from the light source based on the first light amount determined by the first light amount determining section;
   a pre-scan section configured to perform a pre-scan to gather information about the object by controlling the conveying section to move the reading unit in the second direction and further controlling the reading unit to read the object on a line-by-line basis with a first resolution while emanating the second light amount from the light source; and
   a main-scan section configured to perform a main-scan to read the object by controlling the conveying section to move the reading unit in the second direction and further controlling the reading unit to read the object on a line-by-line basis with a second resolution while emanating the first light amount from the light source, control operations by the main-scan section being performed after completion of control operations by the pre-scan section,
   wherein the first light amount determining section is configured to control the reading unit to read a white reference member with the second resolution and to output a first set of line data, the first light amount being determined based on the first set of line data.

2. The image reading device according to claim 1, wherein the pre-scan section is configured to control the reading unit to read a part of the object.

3. The image reading device according to claim 1, wherein the first light amount determining section determines the first light amount and the second light amount determining section determines the second light amount before the pre-scan section performs the pre-scan.

4. The image reading device according to claim 1, wherein the reading unit is configured to read the object with any one of a maximum resolution and one-Nth of the maximum resolution where N is a positive integer and the maximum resolution is defined by a number obtained by dividing the predetermined number of the light receiving elements with a distance over which the predetermined number of light receiving elements are aligned, and wherein when the maximum resolution is designated in reading the object, the reading unit outputs the line data made up of a plurality of sets of pixel data corresponding to respective ones of the predetermined number of light receiving elements, each set of the pixel data representing an amount of light received at each light receiving element, and when the one-Nth of the maximum resolution is designated in reading the object, the reading unit outputs the line data made up of a plurality of sets of group data corresponding to respective ones of a plurality of groups, each group containing a number of consecutively aligned light receiving elements equal to a number obtained by dividing the predetermined number of light receiving elements with N, each set of the group data representing a summed amount of light received at the consecutively aligned light receiving elements.

5. The image reading device according to claim 1, wherein the second light amount determining section is configured to determine the second light amount based on the first resolution, the second resolution, and the first light amount determined by the first light amount determining section.

6. The image reading device according to claim 1, wherein the second light amount determining section is configured to determine the second light amount by a multiplication of a first value, a second value, and a third value where the first value is a value obtained by dividing the first resolution with the second resolution, the second value is the first light amount, and the third value is a positive coefficient smaller than one.

7. The image reading device according to claim 1, wherein the reading unit includes a red color light source irradiating red color light, a green color light source irradiating green color light, and a blue color light source irradiating blue color light, and is configured to be selectively operable in one of a color mode and a monochromatic mode wherein when the reading unit operates with the color mode, the reading unit reads the object and outputs color line data representing a color image on the object while sequentially turning on the red color light source, the green color light source, and the blue color light source, and when the reading unit operates with the monochromatic mode, the reading unit reads the object and outputs the line data representing the image on the object while turning on one of the red color light source, the green color light source, and the blue color light source, wherein the pre-scan section is configured to control the reading unit to be operated in the color mode and the main-scan section is configured to control the reading unit to be operated either the color mode or the monochromatic mode whichever is preliminarily set.

8. The image reading device according to claim 7, wherein when the reading unit is set to operate in the color mode when the main-scan is performed, the first light amount determining section controls the reading unit to read the white reference member while sequentially turning on the red color light source, the green color light source, and the blue color light source and changing a light amount emanated from each of the red color light source, the green color light source, and the blue color light source, and determines the first light amount to be emanated from each of the red color light source, the green color light source, and the blue color light source, wherein when the reading unit is set to operate in the monochromatic mode when the main-scan is performed, the first light amount determining section controls the reading unit to read the white reference member while turning on one of the red color light source, the green color light source, and the blue color light source and changing a light amount emanated from the light source that is turned on, and determines an optimum light amount to be emanated from the light source.

9. The image reading device according to claim 8, wherein when the reading unit is set to operate in the color mode when the main-scan is performed, the second light amount determining section determines the second light amount emanated from each of the red color light source, the green color light source, and the blue color light source based on the first light amount to be emanated from each of the red color light source, the green color light source, and the blue color light source, and when the reading unit is set to operate in the monochromatic mode when the main-scan is performed, the second light amount determining section controls the reading unit to read the white reference member with the first resolution while sequentially turning on the red color light source, the green color light source, and the blue color light source and changing a light amount emanated from each of the red color light source, the green color light source, and the blue color light source, and determines the second light amount to be emanated from each of the red color light source, the green color light source, and the blue color light source.

10. A method of controlling an image reading device including a reading unit in which a light source is disposed for irradiating light onto an object to be read and a predetermined number of light receiving elements is aligned in a first direction, the reading unit outputting line data representing a line image on the object, the method comprising:
    determining a first light amount to be emanated from a light source;
    determining a second light amount to be emanated from the light source based on the first light amount;
    after determining the first light amount and the second light amount, performing a pre-scan to gather information about the object by moving the reading unit in a second direction perpendicular to the first direction and controlling the reading unit to read the object on a line-by-line basis with a first resolution while emanating the second light amount from the light source;
    after performing the pre-scan, performing a main-scan to read the object by moving the reading unit in the second direction and controlling the reading unit to read the object on a line-by-line basis with a second resolution while emanating the first light amount from the light source, and
    controlling the reading unit to read a white reference member with the second resolution and to output a first set of line data, the first light amount being determined based on the first set of line data.

11. The method according to claim 10, wherein the pre-scan is performed to read a part of the object.

12. The method according to claim 10, wherein the determining the first light amount comprises the controlling the reading unit.

13. The method according to claim 10, further comprising prompting a user to designate any one of a maximum resolution and one-Nth of the maximum resolution where N is a positive integer and the maximum resolution is defined by a number obtained by dividing the predetermined number of the light receiving elements with a distance over which the predetermined number of light receiving elements are aligned, wherein when the maximum resolution is designated in reading the object, the reading unit outputs the line data made up of a plurality of sets of pixel data corresponding to respective ones of the predetermined number of light receiving elements, each set of the pixel data representing an amount of light received at each light receiving element, and when the one-Nth of the maximum resolution is designated in reading the object, the reading unit outputs the line data made up of a plurality of sets of group data corresponding to respective ones of a plurality of groups, each group containing a number of consecutively aligned light receiving elements equal to a number obtained by dividing the predetermined number of light receiving elements with N, each set of the group data representing a summed amount of light received at the consecutively aligned light receiving elements.

14. The method according to claim 10, wherein the determining a second light amount is made based on the first resolution, the second resolution, and the first light amount.

15. The method according to claim 10, wherein the determining a second light amount is made by a multiplication of a first value, a second value, and a third value where the first value is a value obtained by dividing the first resolution with the second resolution, the second value is the first light amount, and the third value is a positive coefficient smaller than one.

16. The method according to claim 10, further comprising:
    selecting one of a color mode and a monochromatic mode;
    when the color mode is selected, reading the object and outputting color line data representing a color image on the object while sequentially turning on a red color light source, a green color light source, and a blue color light source; and
    when the monochromatic mode is selected, reading the object and outputting the line data representing the image on the object while turning on one of the red color light source, the green color light source, and the blue color light source,
    wherein the pre-scan is performed in the color mode and the main-scan section is performed either the color mode or the monochromatic mode whichever is preliminarily set.

17. The method according to claim 16, wherein when the color mode is selected when performing the main-scan, the reading unit reads the white reference member while sequentially turning on the red color light source, the green color light source, and the blue color light source and changing a light amount emanated from each of the red color light source, the green color light source, and the blue color light source, wherein the first light amount to be emanated from each of the red color light source, the green color light source, and the blue color light source is determined based on the reading results of the white reference member, wherein when the monochromatic mode is selected when performing the main-scan, the reading unit reads the white reference member while turning on one of the red color light source, the green color light source, and the blue color light source and changing a light amount emanated from the light source that is turned on, and determines an optimum light amount to be emanated from the light source based on the reading results of the white reference member by the light source that is turned on.

18. The method according to claim 17, wherein when the color mode is selected when performing the main-scan, the second light amount emanated from each of the red color light source, the green color light source, and the blue color light source is determined based on the first light amount to be emanated from each of the red color light source, the green color light source, and the blue color light source, and when the monochromatic mode is selected when performing the main-scan, the reading unit reads the white reference member with the first resolution while sequentially turning on the red color light source, the green color light source, and the blue color light source and changing a light amount emanated from each of the red color light source, the green color light source, and the blue color light source, and determines the second light amount to be emanated from each of the red color light source, the green color light source, and the blue color light source.

19. A non-transitory computer-readable storage medium storing a set of program instructions installed on and executed by a computer for controlling an image reading device including a reading unit in which a light source is disposed for irradiating light onto an object to be read and a predetermined number of light receiving elements is aligned in a first direction, the reading unit outputting line data representing a line image on the object, the program instructions comprising:

determining a first light amount to be emanated from a light source;

determining a second light amount to be emanated from the light source based on the first light amount;

performing a pre-scan to gather information about the object by moving the reading unit in a second direction perpendicular to the first direction and controlling the reading unit to read the object on a line-by-line basis with a first resolution while emanating the second light amount from the light source;

after performing the pre-scan, performing a main-scan to read the object by moving the reading unit in the second direction and controlling the reading unit to read the object on a line-by-line basis with a second resolution while emanating the first light amount from the light source, and controlling the reading unit to read a white reference member with the second resolution and to output a first set of line data, the first light amount being determined based on the first set of line data.

* * * * *